United States Patent
Middleswarth et al.

(10) Patent No.: US 6,697,461 B1
(45) Date of Patent: Feb. 24, 2004

(54) METHODS AND APPARATUS FOR PROVIDING CALL SCREENING AND OTHER COMMUNICATION SERVICES

(75) Inventors: Susan M. Middleswarth, Silver Spring, MD (US); John H. Wurster, Basking Ridge, NJ (US)

(73) Assignee: Bell Atlantic Services Network, Arlington, VA (US)

( * ) Notice: Subject to any disclaimer, the term of this patent is extended or adjusted under 35 U.S.C. 154(b) by 0 days.

(21) Appl. No.: 09/505,146

(22) Filed: Feb. 15, 2000

(51) Int. Cl.[7] .............................................. H04M 1/64
(52) U.S. Cl. ................... 379/88.24; 379/80; 379/221.08
(58) Field of Search ........................... 379/67.1, 70, 79, 379/80, 88.01, 88.16, 88.19–88.21, 88.22–88.24, 201.01, 207.02, 207.14, 207.15, 210.01, 210.02, 210.03, 221.08–221.12, 229, 230, 93.26, 372, 373.01, 373.02, 370.02

(56) References Cited

U.S. PATENT DOCUMENTS

| | | | |
|---|---|---|---|
| 4,277,649 A | | 7/1981 | Sheinbein |
| 5,033,076 A | | 7/1991 | Jones et al. |
| 5,265,145 A | | 11/1993 | Lim |
| 5,276,731 A | | 1/1994 | Arbel et al. |
| 5,404,400 A | * | 4/1995 | Hamilton ..................... 379/386 |
| 5,479,493 A | | 12/1995 | Baker et al. |
| 5,497,414 A | | 3/1996 | Bartholomew |
| 5,533,106 A | | 7/1996 | Blumhardt |
| 5,596,627 A | | 1/1997 | Solomon et al. |
| 5,625,680 A | | 4/1997 | Foladare et al. |
| 5,638,424 A | * | 6/1997 | Denio et al. .............. 379/88.18 |
| 5,644,629 A | | 7/1997 | Chow |
| 5,651,053 A | | 7/1997 | Mitchell |
| 5,727,047 A | | 3/1998 | Bentley et al. |
| 5,748,709 A | | 5/1998 | Sheerin |
| 5,768,348 A | | 6/1998 | Solomon et al. |
| 5,774,531 A | | 6/1998 | Johnson |
| 5,781,613 A | | 7/1998 | Knuth et al. |
| 5,828,731 A | * | 10/1998 | Szlam et al. .............. 379/88.16 |
| 5,832,072 A | | 11/1998 | Rozenblit |
| 5,867,562 A | | 2/1999 | Scherer |
| 5,883,942 A | | 3/1999 | Lim et al. |
| 6,208,970 B1 | * | 3/2001 | Ramanan ..................... 704/270 |
| 6,233,319 B1 | * | 5/2001 | Cox et al. ................ 379/88.22 |
| 6,459,780 B1 | * | 10/2002 | Wurster et al. ........ 379/142.02 |
| 2002/0067813 A1 | * | 6/2002 | Pelletier et al. .......... 379/142.1 |

\* cited by examiner

*Primary Examiner*—Roland Foster
(74) *Attorney, Agent, or Firm*—Straub & Pokotylo; Michael P. Straub

(57) ABSTRACT

Call screening is provided by a call processing method, involving detecting a first call directed to the premises of a service subscriber requesting call processing instructions from a service control point in response to the first call, operating the service control point to instruct the signal switching point to temporarily park the first call at the signal switching point, and controlling the disposition of the first call as a function of a determination as to whether a second call to the service subscriber was answered by a machine or a human being.

11 Claims, 7 Drawing Sheets

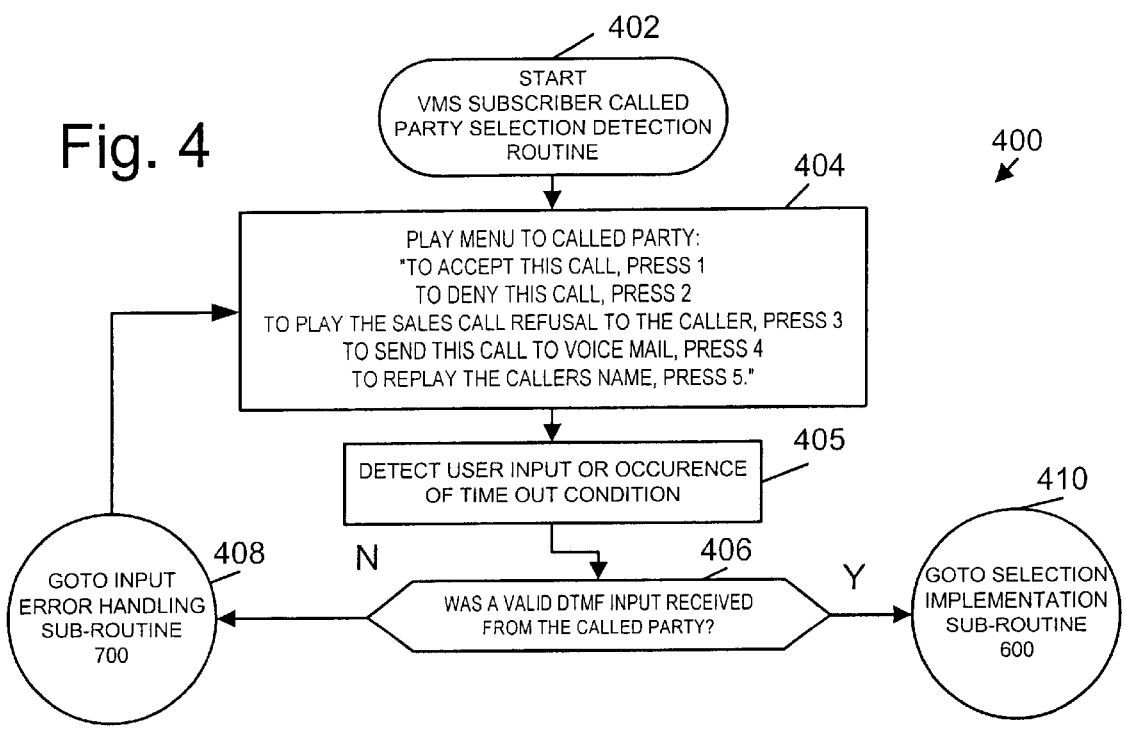
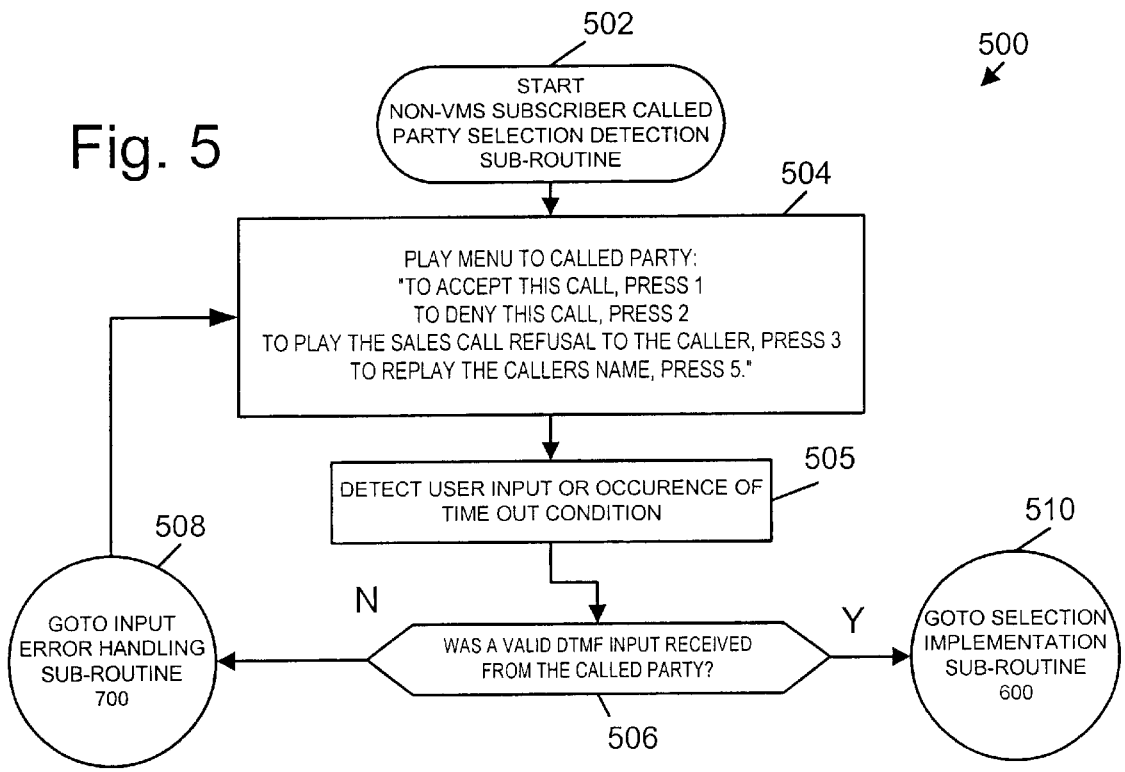

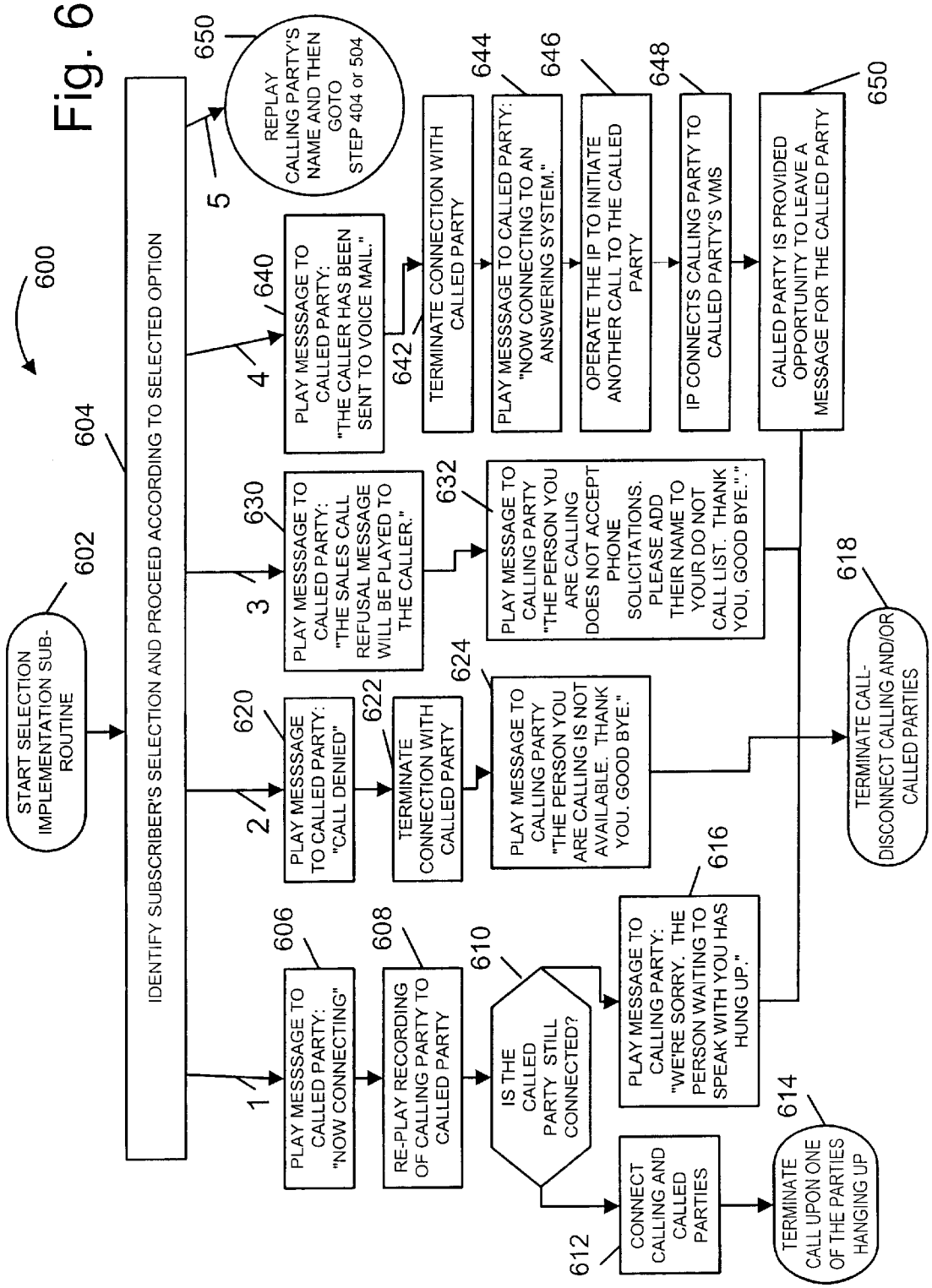

METHODS AND APPARATUS FOR PROVIDING CALL SCREENING AND OTHER COMMUNICATION SERVICES

FIELD OF THE INVENTION

The present invention is directed to communications systems and, more particularly, to methods and apparatus for providing call screening and other communication services.

BACKGROUND OF THE INVENTION

In modern times, telephones have become almost a necessity. Telephones are found in most homes and offices. Marketers have found that the telephone can be used as a powerful sales tool. Telephones provide a way of reaching a potential customer who frequently would not be willing to speak with the marketer if they knew it was a salesperson calling.

Various attempts have been made to shield telephone subscriber's from unwanted calls, e.g., telemarketer calls. Having an unlisted telephone number provides some protection from unsolicited calls from the public at large. Computer controlled sequential dialing of multiple numbers is commonly performed by telemarketers with the express intention of reaching both listed and unlisted telephone service subscribers. Accordingly, unlisted numbers provide little protection from telemarketers.

Most telephone systems today use SS7 (Signaling System 7) standards for communication of telephone calls. SS7 is a digital communications protocol which supports various messaging and call information features which facilitate a variety of telephone services. SS7 facilitates advanced intelligent network (AIN) call processing. Such processing normally includes call handling instructions being obtained by a switch from a service control point (SCP). The SCP normally includes logic, e.g., call processing records, used to provide a switch with specific call processing instructions as a function of information obtained from a database and/or call information provided by the switch or another source. The logic in a switch used to initiate a request to an SCP for call processing instructions is normally referred to as a trigger or an AIN trigger.

The SS7 messaging associated with a telephone call, includes a caller ID field which incorporates the caller's telephone number as well as a caller ID display field. By setting a caller ID blocking bit in the caller ID display field, the display of caller ID information to the called party is prohibited. Accordingly, SS7 provides information which can be useful in identifying a caller but may be blocked from being displayed to a called party.

Unfortunately, in some places in this country and around the world, older analog telephone circuitry remains in use. When a telephone call is routed between telephone switches using this old analog technology, the caller ID information provided by the digital SS7 messaging standard is normally lost.

In order to avoid having to answer calls from unwanted parties, e.g., telemarketers, telephone customer's often subscribe to a caller ID service or an enhanced caller ID service. With basic caller ID service, assuming the call is not passed between switches over analog lines and the caller does not activate caller ID blocking, the calling party's telephone number will be displayed to the called party.

In the case of enhanced caller ID service, the calling party's telephone number is used to perform a database look-up operation which associates the calling party's telephone number with a name in a database, e.g., a line information database (LIDB). Both the name and the calling party's telephone number are then displayed to the called party allowing the called party to make an educated decision as to whether or not to answer the phone call. Unfortunately, not all telephone companies share name and phone number information. In addition, even when the phone companies do exchange such information, names associated with unlisted telephone numbers may be omitted from the database used for providing name information to caller-ID service subscribers.

Telemarketers generally take steps to make sure that caller-ID name information is not available to local telephone companies in regions they are calling. Thus, in the case of most telemarketer calls, subscribers to caller ID services are, at best, provided a telephone number but no identifying name when being called by a telemarketer. Common caller-ID conditions which are encountered in the case of telemarketers are 1) name not available and 2) out of area. Caller ID blocked may be yet another condition which may be encountered.

In order to avoid disturbing telephone subscribes with calls for which caller-ID information is blocked or unavailable, a variety of call screening systems have been designed. U.S. Pat. Nos. 5,497,414 and 5,533,106 describe known call screening systems.

Known call screening services allow a subscriber to the service to program, prior to receipt of a call, how telephone calls for which caller-ID information is blocked or unavailable should be handled. This is done by having the service subscriber provide a list of desired call handling instructions used to create a call processing record (CPR). The call handling instructions may include, e.g., rejecting calls for which caller-ID information is unavailable or blocked, sending such calls to voice mail, or allowing calls for which a preselected call screening override code has been entered to be connected to the called party.

Such call screening services provide a useful tool against telemarketers and other unwanted callers. However, the known systems have several drawbacks. For example they fail to provide the call screening service subscriber the opportunity to receive calls from individuals who do not have a valid override code and whose caller-ID information is not available for legitimate reasons. For example, a calling party's caller Id information may be unavailable because the caller is traveling and calling from a pay phone or other phone for which caller-ID information is unavailable.

Another disadvantage of the known systems, is that calls may be blocked even when the called party is not home. From the calling party's perspective, such a situation may be undesirable since the calling party may be denied the opportunity to leave a message for the called party on an answering machine located on the called premises. From the telephone company's perspective, such a situation is undesirable since the telephone company may be denied revenue that could be collected by completing the call to an answering machine located at the called party's premises.

In view of the above discussion, it is apparent that there is a need for new and improved call screening methods. It is desirable that at least some of the methods provide a manner for informing a called party of a call for which caller ID information is blocked or unavailable and for allowing the called party to make a knowledgeable decision on how to dispose of the call while the calling party is still on the line. It is also desirable that at least some of the methods allow for a call to be completed to an answering machine located at the called premises or to a voicemail system.

SUMMARY OF THE INVENTION

The present invention is directed to methods and apparatus which can be used to provide call screening and other communication services.

In one exemplary embodiment, calls to call screening service (CSS) subscribers are detected at the central office switch to which the called party's premises are connected using a terminating attempt trigger. Upon detecting a call directed to a CSS subscriber, a check is made to see if caller ID information is blocked or unavailable. If the caller ID information is blocked or unavailable, and the calling party does not enter a call screening override code, the call is connected to an intelligent peripheral (IP) which is used to play messages to the calling and/or called party, to collect information and/or menu selection entries from the calling and/or called party, and to control ultimate disposition of the call.

As part of the call screening processing performed by the IP, in one exemplary embodiment, the IP records spoken caller identification information. The IP then calls the CSS subscriber to whom the call was directed. The terminating attempt trigger at the caller's switch detects the call from the IP to the CSS subscriber. However, since this second call to the caller is from the IP, the service control point responsible for providing call processing instructions to the switch result in the switch connecting the call from the IP to the subscriber's premises.

The IP is programmed to detect whether a human or machine answers the IP initiated call to the subscriber premises and to control subsequent call processing based on whether the call is answered by a human or machine. The manner in which a human or machine response is detected can vary depending on the embodiment.

In one exemplary embodiment, connection to an answering machine is determined by detecting a tone, e.g., recording prompt, or other audio or electrical signal indicative of a response from an answering machine.

In another exemplary embodiment, upon detecting that the call to the subscriber has been answered, the IP plays a message prompting for input from the subscriber. If the requested input, e.g., specific numbers entered using the phone key pad or spoken words, are not entered, it is assumed that a machine has answered the call and the IP connects the caller to the subscriber premises so a message may be left on the answering machine located there. Alternatively, under such circumstances, the caller may be connected to a subscriber's voicemail system.

If the requested input is received from the subscriber premises, it indicates that a human has answered the IP's call. Upon receiving the requested input, the subscriber is played a recording of the caller's name which was supplied by the caller and recorded by the IP. The called party is then provided a menu of call disposition options including, e.g., refuse the call, play a no salesperson message to the caller, transfer the call to voice mail (if the CSS subscriber is also a VMS subscriber) and accept the call. In response to detection of a call disposition selection made by the subscriber, the IP implements the requested disposition option.

In the exemplary embodiment, when the forward to voice mail option is selected by the CSS subscriber, the IP's call to the CSS subscriber is first terminated. A new call to the CSS subscriber is then initiated by the IP. This results in the terminating attempt trigger on the CSS subscriber's line to be triggered for a third time. In response to a request for call processing instructions initiated by the third trigger event, a service control point (SCP) instructs the subscriber's switch to transfer the call from the IP to the subscriber's VMS system. The calling party is then connected by the IP to the called party's VMS system where the caller can leave a message.

The above described call screening service makes significant use of an IP's capability to play messages, collect information, and control call disposition in response to received input. In addition, it allows a CSS subscriber to interact with the IP while a caller is on the line thereby allowing individual customized disposition of individual calls based on orally supplied caller identification information. Notably, the CSS process of the present invention is able to determine whether a call is answered by a human or an answering machine. This allows users to continue to use answering machines while still benefiting from call screening service features which allow for real time call disposition input from a called party when available.

Various additional features and advantages of the present invention will be apparent from the detailed description which follows.

BRIEF DESCRIPTION OF THE DRAWINGS

FIG. 4 illustrates a voice mail service (VMS) subscriber called party selection detection routine which can be executed by the IP of FIG. 2.

FIG. 5 illustrates a non-VMS subscriber called party selection detection routine which can be executed by the IP of FIG. 2.

FIG. 6 illustrates steps associated with implementing a caller ID subscriber's call disposition selection in accordance with the present invention.

DETAILED DESCRIPTION

Figure 1:
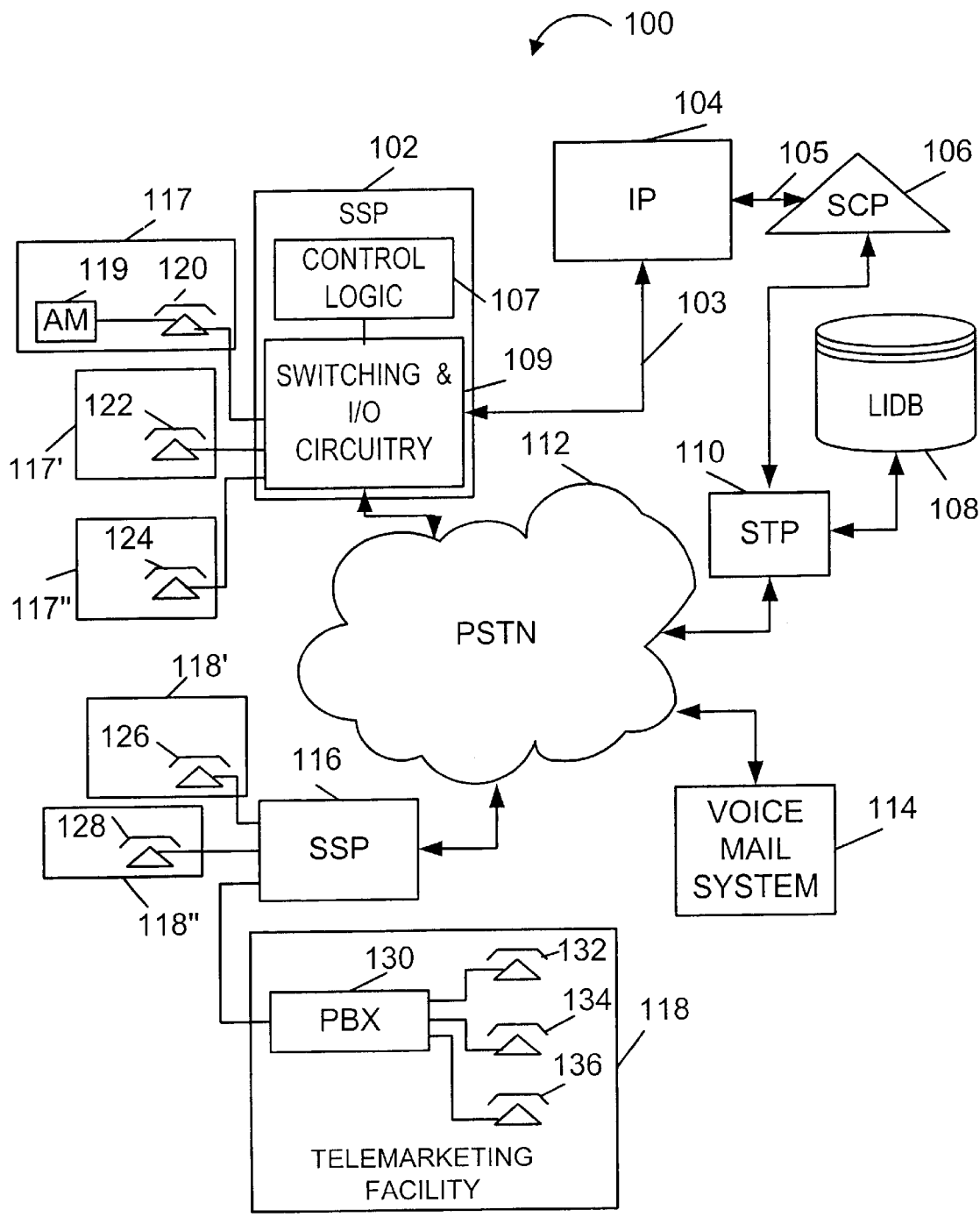
FIG. 1 illustrates a communication system implemented in accordance with an exemplary embodiment of the present invention.

As discussed above, the present invention is directed to methods and apparatus for providing call screening and other communication services. FIG. 1 illustrates a communication system 100 implemented in accordance with the present invention. As illustrated, the system comprises a first signal switching point (SSP) 102 which may be, e.g., a central office switch, a signal transfer point (STP) 110, voice mail system 114, and a second SSP 116 which are coupled to one another via a public switched telephone network (PSTN) 112. The PSTN 112 may use, e.g., SS7 signaling.

The first SSP 102 includes control logic 107 in addition to switching and input/output (I/O) interface circuitry 109. First through third subscriber premises 117, 117', 117" are coupled to the PSTN via the first SSP's circuitry 109. Each of the first through third subscriber premises 117, 117', 117" includes a telephone 120, 122, 124, respectively. In addition, the first subscriber premise includes an answering machine 119 for recording messages from callers who call the first subscriber premises 117 when the subscriber is unavailable. The control logic 107 is programmed to detect calls directed to call screening service (CSS) premises which are connected to the first SSP 102. A termination attempt trigger (TAT) is used for this purpose. The switch's control logic 107 is also programmed to seek call processing instructions, e.g., from an SCP, and thereafter follow received call processing instructions, for calls which result in a TAT being activated.

For purposes of explanation, assume that the telephone customer located at the first subscriber premises 117 is a call screening service subscriber. In such a case, a TAT would be set at the SSP 102 to be activated each time a call directed to the telephone number corresponding to the first subscriber premises 117 was detected at the switch 102.

In order to provide AIN functionality and services such as the call screening service of the present invention, the communication system 100 includes a service control point (SCP) 106 and intelligent peripheral (IP) 104. The SCP 106 is coupled to the SSPs 102, 116 via the STP 10 and PSTN 112. The STP AND PSN are used to convey the control, data and/or voice signals as is known in the art. The IP 104 is coupled to the SCP via a TCP-IP connection 105. This connection may be used for transferring data, e.g., call and/or input information, between the IP 104 and SCP 106. The IP 104 is also coupled to the first switch 102. An SS7 communications channel 103 is used for the connection between the IP 104 and switch 102.

The SCP 106 may be implemented using conventional hardware which is combined with instructions used to perform the novel call screening processing of the present invention. The SCP 106 includes call processing records, designed in accordance with the present invention, which include call handling instructions to be provided to a switch 102 in response to execution of a TAT trigger at the switch 102. The call processing instructions associated with a particular called number vary depending on the services to which the customer, corresponding to the called number, subscribes. The instructions provided to a switch in response to a particular call can depend on: input received from the calling and/or called party, control information provided by SS7 signaling such as ANI information, as well as other communication system status information such as the on or off-hook condition of a line at a particular point in time. The SCP 106 can access a line information database (LIDB) 108, via STP 110. In this manner, the SCP can obtain caller ID information, e.g., calling party name information, using a calling party's telephone number, when the information is available from the LIDB. Based on the caller ID information and status of a caller ID blocking indicator included in a call, and/or any information returned from the LIDB look-up operation, the SCP can determine whether caller ID information is unavailable, or caller ID blocked condition exists. As will be discussed below, any one of these conditions results in the SCP 106 initiating call screening procedures in accordance with the present invention.

The second SSP 116, like the first SSP 102, may be implemented using a central office switch, e.g., an SS7 capable switch. The second SSP 116 is coupled to fourth through sixth subscriber premises 118, 118' and 118". While fifth and sixth subscriber premises 118', 118" are private residences which merely include telephones 126, 128, respectively, the first subscriber premises 118 is a telemarketing facility. The telemarketing facility 118 includes a private branch exchange 130 and a plurality of telephones 132, 134, 136. Using the PBX 130, a telemarketer using one of the phones 132, 134, 136, can sequentially call a series of telephone numbers, e.g., the telephone numbers corresponding to telephone subscriber premises 117, 117', 117". Assuming that the telephone subscriber located at the first subscriber premises 117 subscribes to the call screening service of the present invention, a telemarketing call directed to the premises 117 would result in a TAT being executed at the first switch 102.

Figure 2:
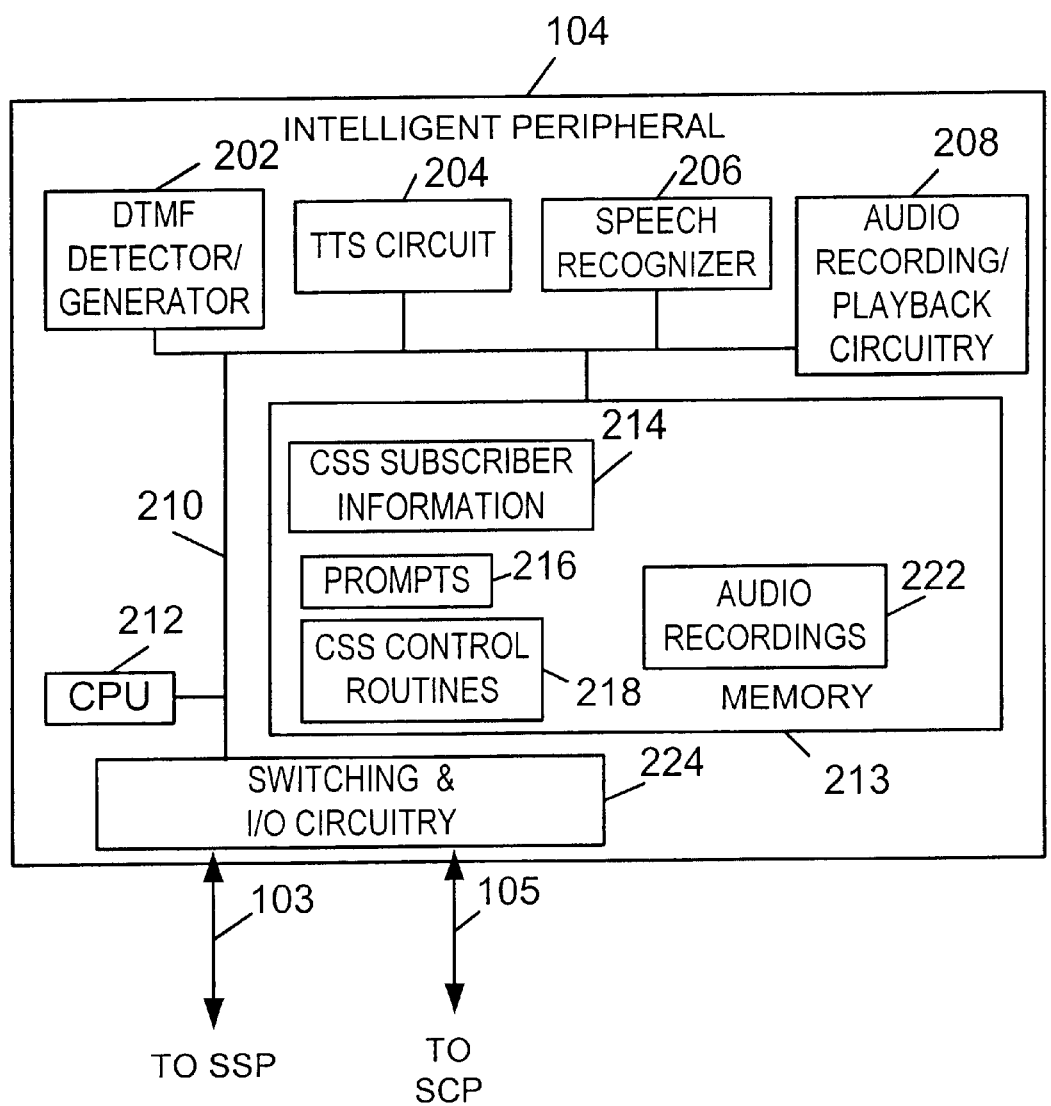
FIG. 2 illustrates an intelligent peripheral (IP) used in the system of FIG. 1.

The intelligent peripheral (IP) 104 is illustrated in greater detail in FIG. 2. As illustrated the IP 104 includes a DTMF detector/generator circuit 202, a text to speech (TTS) circuit 204, a speech recognizer 206, audio recording and playback circuitry 208, a central processing unit CPU 212, memory 213 and switching and I/O circuitry 224 which are coupled together by a bus 210. The switching and I/O interface circuitry 224 is coupled to the SSP 102 via communications line 103 and to the SCP 106 via TCP/IP connection 105. The circuitry 224 is responsible for performing switching operations and for converting between protocols used on the communication lines 103, 105 and various components coupled to the internal bus 210 thereby allowing the exchange of instructions, data and other signals between the SSP 102, SCP 106 and the various components of the IP 104.

The DTMF detector/generator 202 is used for detecting DTMF input from a caller and for generating DTMF signals used to place a call through the switch 102. TTS circuit 204 is capable of generating audible speech from electronic text prompts. The TTS circuit 204 is useful for prompting a caller for input and/or for playing messages to a party to thereby provide the party with call or service related information. The speech recognizer 206 is capable of recognizing speech. In various embodiments, it is used to detect spoken digits received in response to a request for a numerical input, e.g., a numbered menu selection. The audio recording/playback circuit 208 provides speech recording and playback capability. In various embodiments, it is used to store verbal identification information, e.g., a spoken name, obtained from a calling party and to later playback the recorded information to a called party.

The CPU 212 is responsible for controlling IP operation under direction of instructions included in the various routines stored in the memory 213. As illustrated, the memory 213 includes call screening service subscriber information 214, a set of text prompts 216, CSS control routines 218 and audio recordings 222. In another embodiment, CSS information 214 is stored in the SCP 106 as opposed to the IP 104.

The CSS subscriber information 214 is stored in the IP and/or SCP, includes lists of CSS subscribers, identified by their corresponding telephone numbers, information on whether they are also voice mail service (VMS) subscriber's, one or more call screening override codes and related service billing information. As will be discussed below, the CSS subscriber information 214 is accessed and used by the CSS control routines 218 in controlling operation of the IP 104 to service a call directed to a call screening service subscriber. Individual prompts included in the set of prompts 216, are supplied to the speech generator 204 as required when performing a call screening operation. Audio recordings 222 include recordings of spoken identification information, e.g., caller's names, generated by recording circuit 208. As will be discussed below, the recording of a calling party's speech, e.g., spoken name, is played to a called party at specific times while performing call screening in accordance with the present invention.

The CSS control routines 218 are executed by the IP 104 when a call screening service is to be performed. The steps performed by the IP under direction of the CSS control routines 218 will be discussed in detail below with regard to FIG. 3.

Figure 3A:
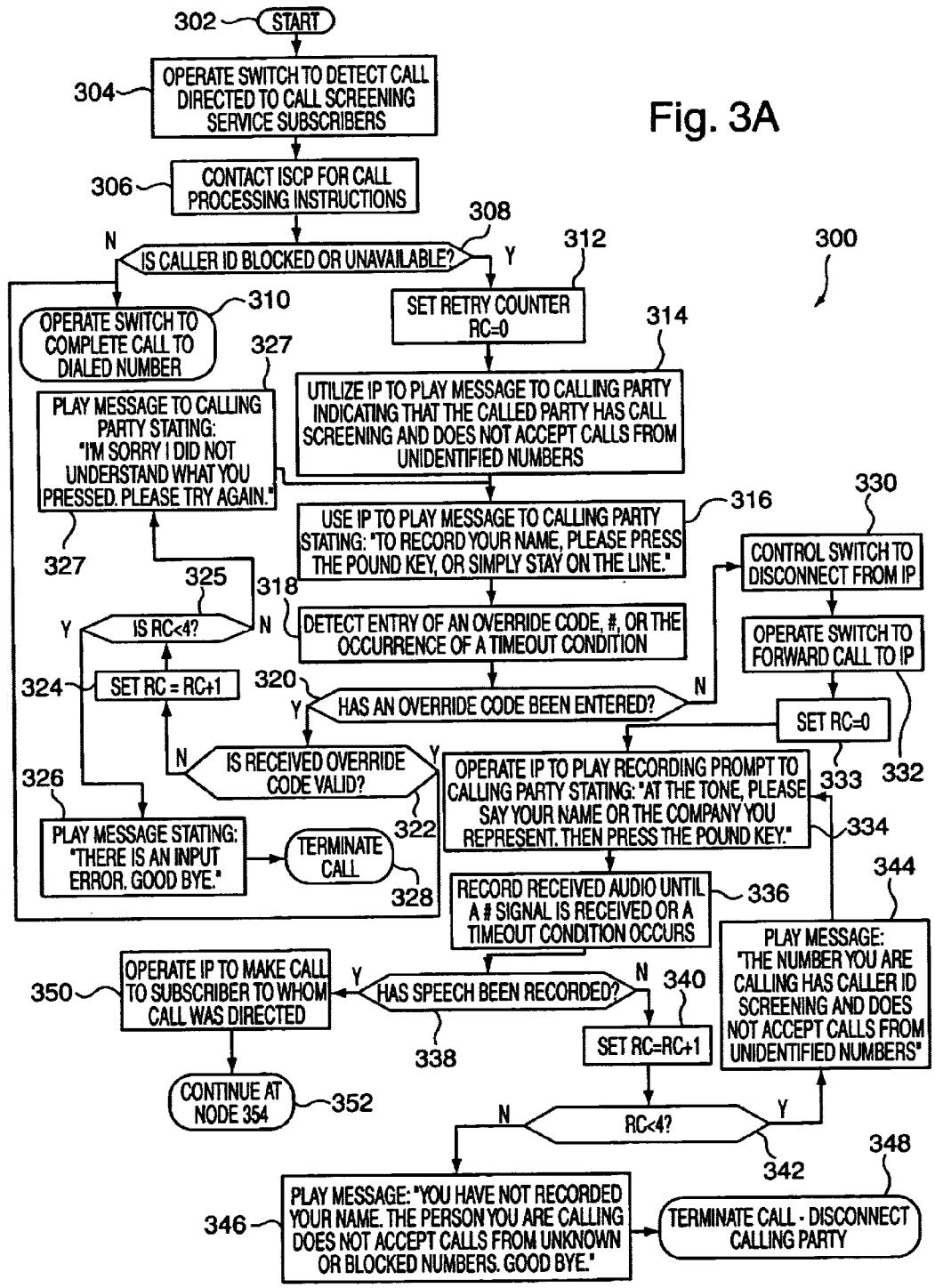
FIG. 3, which comprises the combination of FIGS. 3A and 3B, illustrates the steps of the present invention associated with processing a call directed to a call screening service subscriber.
Figure 3B:
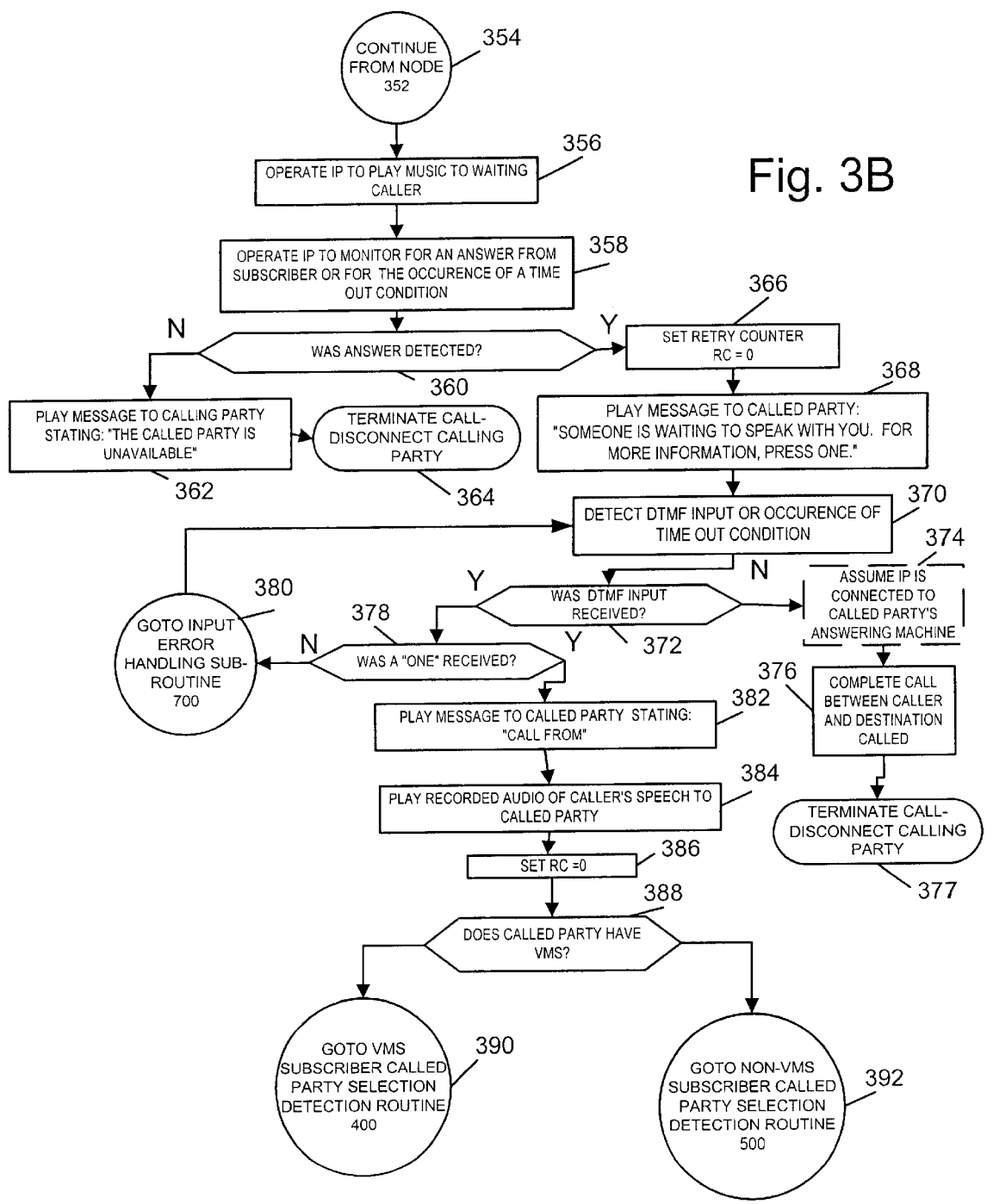

FIG. 3, which comprises the combination of FIGS. 3A and 3B, illustrates the call processing method 300 of the present invention. The method begins in start step 302 wherein the components of the system 100 are initialized. For example, in step 302 an AIN terminating attempt trigger (TAT) is set at the switch 102 on each of the lines corresponding to a call screening service subscriber. For purposes of explanation, it will be assumed that the telephone customer located at customer premises 117 is a call screening service subscriber. In such a case, in step 302, a TAT trigger is set to detect calls received at the switch 102 that are directed to the telephone number corresponding to subscriber premises 117.

Once the triggers are set in step 302 operation proceeds to step 304. In step 304 the switch 102 is operated to use the triggers to detect calls directed to call screening service subscribers.

Upon detecting a call to a call screening service subscriber, e.g., a call directed to customer premises 117, the TAT set at switch 102 is activated and operation proceeds to step 306. In step 306, in response to a call to customer premises 117, the switch 102 initiates a call processing instruction request to the SCP 106. As part of the request, the switch 102 passes called party identification information, e.g., the telephone number called, calling party identification information, e.g., ANI information, and caller-ID blocking status bit information to the SCP 106.

In response to the first request for call processing instructions, in step 308, the SCP 106 determines if the caller ID information is blocked or unavailable. This is done by examining the contents of the Calling Party ID parameter in the call processing query message sent to the SCP. If the calling party number is blank or the caller-Id blocking bit, which may be set by the caller, is set to prohibit display of caller ID information, the SCP 106 concludes that the caller ID is unavailable or blocked.

In step 308, if it is determined that the caller ID information is not blocked and is available, the SCP returns the caller ID information to the switch 102 and instructs the switch to allow the call to be completed to the called CSS subscriber 117. In step 310 the switch 102 is operated to complete the call to the called CSS party, e.g., subscriber premises 117, and the call is then allowed to terminate in a normal manner, e.g., with one of the parties hanging up.

However, if in step 308, it is determined that the calling party has the caller ID blocked or that caller ID information is unavailable, the SCP 106 instructs the switch 102 to use the IP 104 to obtain additional information, e.g., identification information from the calling party, and operation proceeds to step 312. The switch 102 does this, in one embodiment, by performing a send to outside resource operation in response to the instructions from the SCP 106 where the outside resource is an IP 104.

In step 312, a retry counter, RC, which may be maintained by the IP 104, is initialized to 0. Next, in step 314, the IP 104 is used to play a message, e.g., one of the prompts 216, to the calling party using speech generator 204. The message states: "THE CALLED PARTY HAS CALL SCREENING AND DOES NOT ACCEPT CALLS FROM UNIDENTIFIED NUMBERS". Then, in step 316 the IP 104 is used to play another message to the calling party. This time the message states: "TO RECORD YOUR NAME, PLEASE PRESS THE # KEY OR SIMPLY STAY ON THE LINE".

In response to this message the caller can, optionally, enter a call screening override code. In this manner, a family member or other individual to whom the called party has provided override code information can override the call screening process and be connected to the called party even when caller ID information is blocked or unavailable.

From step 316, operation proceeds to step 318 wherein the SCP 106 detects entry of an override code, entry of the pound symbol (#), or the occurrence of a timeout condition. In step 320, a determination is made as to whether or not an override code was entered. If an override code, e.g., one or more DTMF signals other than the # symbol, was entered operation proceeds to step 322.

In step 322 a check is made to determine if the override code was valid. This may involve a comparison of a received override coded to one or more valid override codes stored in the CSS subscriber information 106 for the CSS subscriber to whom the call was directed. If the received override code is valid for the called party, operation proceeds to step 310 wherein the switch 102 connects the calling party to the called party.

However, if the override code is determined in step 322 to be invalid, operation proceeds to step 324 wherein the retry counter RC is incremented by one. Then in step 325 the value RC is compared to 4. If RC is less than 4, operation proceeds to step 327 in order to provide the calling party another opportunity to enter an override code or provide name information. In step 327, the IP plays the calling party a message stating: "I'M SORRY I DID NOT UNDERSTAND WHAT YOU PRESSED. PLEASE TRY AGAIN". With the playing of the message, operation proceeds from step 327 to step 316.

RC equaling or exceeding 4 indicates that the calling party has already had three unsuccessful attempts at entering an override code. If in step 325 it is determined that RC is not less than 4, operation proceeds from step 325 to step 326. In step 326, the caller is played a message stating: "THERE IS AN INPUT ERROR. GOOD BYE." Then, in step 328, the call is terminated by the switch 102.

In step 320, if it is determined that an override code has not been entered, operation proceeds to step 330. In step 330, the switch 102 is instructed to disconnect from the IP 104 . Then, in step 332, the switch 102 is controlled to forward the call being processed to the IP 104. At this point, the transaction between the switch 102 and the SCP 106 which was initiated in response to the first call to the CSS subscriber 117 is closed and the IP 104, under control of the CSS control routines 218, takes over call processing. Then in step 333 the retry counter RC is reset to 0. From step 333 operation proceeds to step 334.

In step 334, the IP 104 plays a recording prompt to the caller stating: "AT THE TONE, PLEASE SAY YOUR NAME OR THE COMPANY YOU REPRESENT, THEN PRESS THE POUND KEY". Then, in step 336, the IP records the audio from the caller until a time out condition occurs or entry of a # signal is detected, e.g., by the DTMF detector 202.

In step 338 a determination is made as to whether or not speech, e.g., a name, has been recorded. This step may be made by distinguishing from a recording of silence as opposed to speech. If any speech was recorded, it is assumed to be a name since a name was requested. Any one of a plurality of known techniques may be used to implement step 338.

If in step 338 if it is determined that speech has not been recorded, operation proceeds to step 340 wherein the retry counter RC is incremented operation then proceeds to step 342.

In step 342, RC is compared to 4. If RC<4, then operation proceeds to step 344 to provide the caller another opportunity to record a name. In step 344 the IP 104 plays a message to the caller stating: "THE NUMBER YOU ARE CALLING HAS CALL INTERCEPT AND DOES NOT ACCEPT CALLS FROM UNIDENTIFIED NUMBERS". Operation then proceeds once again to step 334, wherein the caller is prompted to provide a name.

If in step 342 it is determined that RC is not less than 4, i.e., the caller has already been provided three chances to leave a name, operation proceeds to step 346. In step 346, the caller is played a message stating: "YOU HAVE NOT RECORDED YOUR NAME. THE PERSON YOU ARE CALLING DOES NOT ACCEPT CALLS FROM UNKNOWN OR BLOCKED NUMBERS. GOOD BYE". Then, in step 348, the call is terminated with the calling party being disconnected.

In step 338, if it is determined that a name provided by the calling party was recorded, operation proceeds to step 350 wherein the IP 104 places a call to CSS subscriber 117 via switch 102. This causes the TAT trigger on the CSS subscriber's line to be activated a second time launching a second request to the SCP 106 for call processing instructions. Recognizing the IP 104 as the calling party, the SCP instructs the switch 102 to complete the call from the IP to the CSS subscriber 117.

Via connection nodes 352 and 354 which serve to link FIGS. 3A and 3B together, operation proceeds from step 350 to step 356. In step 356, the IP 104 plays music to the waiting caller. Then in step 358 the IP 104 is operated to monitor for an answer from the subscriber located at the called premises 117 or for the occurrence of a time out condition. An answer may be detected by examining the hook-status of the called party's line. The occurrence of an off-hook condition, in response to the IP's call to the CSS subscriber, indicates an answer.

If no answer is detected in step 360, operation proceeds to step 362 wherein the IP 104 plays a message to the calling party stating: "THE CALLED PARTY IS UNAVAILABLE". Then in step 364 the call is terminated with the calling party being disconnected. Alternatively, if the called party is a VMS subscriber, the call may be completed to the subscriber's VMS system.

If an answer is detected in step 360, operation proceeds to step 368 after the retry counter RC is reset to 0 in step 366. In step 368 the IP 104 plays a message to the called party stating: "SOMEONE IS WAITING TO SPEAK WITH YOU. FOR MORE INFORMATION, PRESS ONE." Then in step 370 DTMF input or the occurrence of a time out condition is detected. In step 372, a determination is made as to whether or not DTMF input was detected in step 370.

If it is determined in step 372 that DTMF input was not received, it is assumed that an answering machine has answered the call to the CSS subscriber's premises 117, and operation proceeds to step 376. Block 374 which states the assumption being made is not an actual processing step but is included for purposes of explanation. In step 376, the calling party is connected to the called CSS subscriber premises 117 thereby allowing the calling party to leave a message on the answering machine 119. In step 377, the call is allowed to terminate in a normal manner, e.g., with either the calling party or the answering machine 119 terminating the call by hanging up.

In step 372, if it is determined that a DTMF input was received, operation proceeds to step 378 wherein a determination is made as to whether or not the requested number "one" was received in DTMF format. If it is determined that a one was not received, operation proceeds to input error handling subroutine 700 wherein the IP seeks additional input or terminates the call after a preselected number of tries. The input error handling routine 700 will be described below in detail with regard to FIG. 7. Upon returning from the error handling sub-routine 700 operation proceeds to step 370 wherein input from the called party or the occurrence of a time out condition is once again detected.

If in step 378, it is determined that a one was received, indicating that a human operator provided a response to the message about a waiting caller, operation proceeds to step 382. In step 382, the IP plays the subscriber a message stating: "CALL FROM:". Then in step 384, the IP 104 plays to the called party, the recorded audio of the calling party's speech which was obtained in response to a request for a name. Next in step 386, the retry counter RC is reset to 0. Then in step 388 a determination is made as to whether or not the called CSS subscriber is also a voice mail service (VMS) subscriber. The menus of call disposition options provided to the called party vary depending on whether or not the called party is a VMS subscriber.

If the called party is a VMS subscriber operation proceeds to the called party selection detection routine 400 via step 390. However, if in step 388 it is determined that the called party is not a VMS subscriber, operation proceeds to the non-VMS subscriber called party selection detection routine 500.

The VMS subscriber called party selection detection routine 400 begins in start step 402 of FIG. 4 wherein it begins being performed by the IP 104 under control of CPU 212. Operation proceeds from start step 402 to menu step 404, wherein the IP plays a menu to the called party. In one exemplary embodiment, it does this by playing the message: "TO ACCEPT THIS CALL, PRESS 1; TO DENY THIS CALL, PRESS 2; TO PLAY THE SALES CALL REFUSAL TO THE CALLER, PRESS 3; TO SEND THIS CALL TO VOICE MAIL, PRESS 4; TO REPLAY THE CALLERS NAME, PRESS 5".

Next, in step 405 user input or the occurrence of a time out condition is detected by the IP 104. Then in step 406 a determination is made as to whether or not a valid DTMF input was received from the called party. That is, a determination is made as to whether a number on the menu played in step 404 was received. If a valid input was received by the IP 104 from the called party, operation proceeds to the selection implementation subroutine 600 via step 410. However, if a valid input was not received from the called party, operation proceeds to step 408 wherein the input error handling sub-routine 700 is called. Upon returning from the input error handling sub-routine, operation proceeds from step 408 to step 404 wherein the menu of available call disposition options is again played to the called party.

The NON-VMS subscriber called party selection detection routine 500 begins in start step 502 of FIG. 5 wherein it begins being performed by the IP 104 under control of CPU 212. Operation proceeds from start step 502 to menu step 504, wherein the IP plays a menu to the called party. In one exemplary embodiment, it does this by playing the message: "TO ACCEPT THIS CALL, PRESS 1; TO DENY THIS CALL, PRESS 2; TO PLAY THE SALES CALL REFUSAL TO THE CALLER, PRESS 3; TO REPLAY THE CALLERS NAME, PRESS 5". Note that this menu is the same as that provided in step 404 to the VMS subscriber with the exception that the voice mail option is not presented to the called party since the party does not subscribe to the VMS service.

Next, in step 505 user input or the occurrence of a time out condition is detected. Then in step 506 a determination is made as to whether or not a valid DTMF input was received from the called party. That is, a determination is made as to whether a number on the menu played in step 504 was received. If a valid input was received by the IP 104 from the called party, operation proceeds to the selection implementation sub-routine 600 via step 510. However, if a valid input was not received from the called party, operation proceeds to step 508 wherein the input error handling sub-routine 700 is called. Upon returning from the input error handling sub-routine 700, operation proceeds from step 508 to step 504 wherein the menu of available call disposition options is again played to the called party.

FIG. 6 illustrates the selection implementation sub-routine 600. The routine 600 begins in step 602 and proceeds to step 604 wherein the processing path to be followed is determined as a function of the DTMF input, e.g., value, received from the called party. Step 604 may be implemented using a case statement as is known in the programming art.

If a 1 is received as the menu selection from the called party, path 1 is followed from step 604 to step 606. In step 606 the IP 104 plays a message to the called party stating: "NOW CONNECTING". Then in step 610, a determination is made as to whether or not the calling party is still connected to the switch, i.e., the calling party has not hung up while waiting for the called party.

If in step 610 it is determined that the calling party is still connected operation proceeds to step 612 wherein the calling and called parties are connected together. After the calling and called parties are connected by the IP 104, the call is allowed to terminated in step 614 in a normal fashion, e.g., with one of the parties hanging up.

If, however, in step 610 it is determined that the calling party is no longer connected, e.g., because they hung up, the IP 104, in step 616, plays the calling party a message stating "WE'RE SORRY. THE PERSON WAITING TO SPEAK WITH YOU HAS HUNG UP". The call is then terminated in step 618.

If a 2 is received as the menu selection from the called party, path 2 is followed from step 604 to step 620. In step 620 the IP 104 plays a message to the called party stating: "CALL DENIED". This announcement is followed in step 622 with the termination of the connection between the IP and the called party. In step 624 the calling party is played a message "THE PERSON YOU ARE CALLING IS NOT AVAILABLE. THANK YOU. GOOD BYE." The call is then terminated in step 618 with the calling party being disconnected from the IP 104 and switch 102.

If a 3 is received as the menu selection from the called party, path 3 is followed from step 604 to step 630. In step 630 the IP 104 plays a message to the called party stating: "THE SALES CALL REFUSAL MESSAGE WILL BE PLAYED TO THE CALLER." This announcement is followed in step 632 with a message being played to the calling party. The message played to the calling party states: "THE PERSON YOU ARE CALLING DOES NOT ACCEPT PHONE SOLICITATIONS. PLEASE ADD THEIR NAME TO YOUR DO NOT CALL LIST. THANK YOU. GOOD BYE." The call is then terminated in step 618.

If a 4 is received as the menu selection from the called party, path 4 is followed from step 604 to step 640. In step 640 the IP 104 plays the message "THE CALLER HAS BEEN SENT TO VOICE MAIL" to the called party. This announcement is followed in step 642 with the termination of the connection between the IP and the called party. In step 644 the calling party is played a message "NOW CONNECTING TO AN ANSWERING SYSTEM." In step 646, the IP initiates a new call to the CSS subscriber's premises 117. This call causes the TAT on the subscriber's line to be activated for the third time. In response to activation of the TAT the switch 102 initiates a new inquiry to the SCP 106 for call processing instructions. At this point in time, the calling party is still connected to the IP 104 and the SCP 106. The SCP 106 detects from the call information provided to it that this is the second call from the IP to the CSS subscriber in regard to the call from the calling party. In response to this second call from the IP, the SCP instructs the switch 102 to connect the call to the CSS subscriber's VMS 114. The IP 104, in step 648, connects the calling party to the called party's VMS. Then in step 650 the calling party is provided an opportunity to leave a message for the called party prior to the call being terminated in step 618.

If a 5 is received as the menu selection from the called party, path 5 is followed from step 604 to step 650. Step 650 is a GO TO STEP. In step 650, operation proceeds to step 384 and then to step 404 if the called party is a VMS subscriber and to step 504 if the called party does not subscribe to voice mail. Thus, via the path provided by step 650, the called party is provided an opportunity to hear the menu of available call disposition options again.

Figure 7:
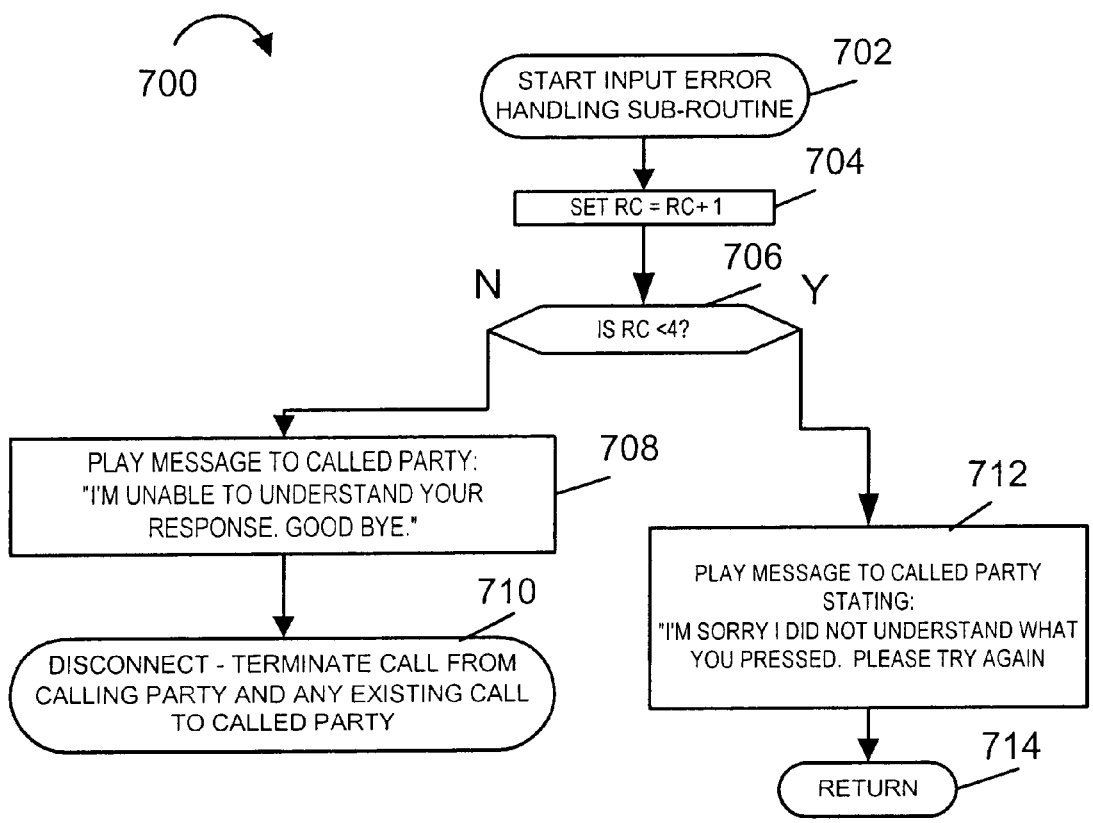
FIG. 7 illustrates the steps of an error handling routine.

An exemplary input error handling sub-routine 700 which may be used by various other IP control routines and steps, is illustrated in FIG. 7. The routine 700 is used to determine if the party providing input should be provided another opportunity to input the request information or menu selection or the call should be terminated. In the FIG. 7 embodiment, a party is given a total of 3 chances to input expected data with the retry counter RC being used to determine when the three chances have been provided.

Operation proceeds from start step 702 to step 704 wherein the retry counter RC is incremented by one. Then, in step 706 a determination is made as to whether RC is less than 4. If RC is not less than 4, e.g., 4 or greater, three chances have already been provided to supply the expected input and operation proceeds to step 708. In step 708, the IP plays a message to the called party stating: "I'M UNABLE TO UNDERSTAND YOUR RESPONSE. GOOD BYE." Then in step 710 the call is terminated.

However, if in step 706 it is determined that RC is less than 4, operation proceeds to step 712 wherein the IP plays the message: "I'M SORRY I DID NOT UNDERSTAND WHAT YOU PRESSED. PLEASE TRY AGAIN." Operation then returns in step 714 to the routine or sub-routine which called the input error handling routine 700 to allow another chance to enter the expected input.

Through the above discussed process, a subscriber can be shielded from calls with blocked or unavailable caller ID information while allowing the CSS subscriber to specify call disposition options in real time. In addition, because the process provides for handling responses from a caller's answering machine, the processes of the present invention is compatible with the use of home answering machines.

In the embodiment described above responses to prompts other than a name prompt are normally entered by depressing telephone keys. However, the system of the present invention can, and in one embodiment does, use speech recognition techniques to allow a CSS subscriber to enter responses using speech. In such an embodiment, a CSS subscriber may state "one" to select call disposition option one from the menu of call disposition options or enter "1"

using a telephone keypad. A spoken "1" is detected by the IP's speech recognizer 206 while a "1" entered using the telephone keypad is detected by DTMF detector/generator circuit 202.

While the detection of calls directed to a CSS subscriber has been described as being performed at the switch 102 to which the lines to the subscriber premises are connected, it is to be understood that the same functionality may be implemented elsewhere in the system 100, e.g., at another switch through which calls are routed, using a similar trigger to detect calls to CSS subscriber's.

Numerous additional embodiments, within the scope of the present invention, will be apparent to those of ordinary skill in the art in view of the description included herein and the claims which follow.

What is claimed is:

1. A call processing method, comprising the steps of:

detecting, using a trigger set at a signal switching point, a first call directed to the premises of a service subscriber;

requesting call processing instructions from a service control point in response to the first call activating said trigger;

operating the service control point to instruct the signal switching point to:
        i) temporarily park the first call at the signal switching point; and
        ii) utilize an intelligent peripheral device coupled to the switch as an outside resource to play messages and obtain additional input to be used by the service control point in determining how the signal switching point should dispose of the first call;

initiating a second call to the premises of the service subscriber;

determining if the second call is answered by a machine or a human being; and controlling the disposition of the first call as a function of the determination as to whether the second call was answered by a machine or a human being.

2. The method of claim 1, wherein the step of controlling the disposition of the first call includes the step of:

completing the first call to the premises of the first subscriber when it is determined that the second call is answered by a machine.

3. The method of claim 2, wherein the step of completing the first call includes the step of bridging the first and second calls.

4. The method of claim 2, further comprising the step of:

playing a message to a calling party associated with the first call indicating that the first call is being connected to an answering machine.

5. The method of claim 2, wherein the step of controlling the disposition of the first call includes the step of:

requesting call disposition input from the human being when it is determined that the second call is answered by a human being.

6. The method of claim 1, wherein the step of controlling the disposition of the first call includes the step of:

requesting call disposition input from the human being when it is determined that the second call is answered by a human being.

7. The method of claim 1, wherein the step of:

determining if the second call is answered by a machine or a human being includes the steps of:
    playing a message requesting input;
    monitoring for the requested input; and
    determining that the second call was answered by a human being when the requested input is received.

8. The method of claim 7, wherein the step of playing a message requesting input includes the step of:

playing an audio message requesting input which can be entered by pressing at least one key of a telephone keypad.

9. The method of claim 8, wherein the step of monitoring for the requested input includes the step of:

monitoring for a DTMF tone corresponding to at least part of the requested input.

10. The method of claim 1, wherein the step of determining if the second call is answered by a machine includes the step of:

monitoring for a signal indicative of a machine answering the second call.

11. The method of claim 10, wherein the signal indicative of a machine answering the second call is an audible tone used as a recording prompt.

* * * * *